Figure 1:
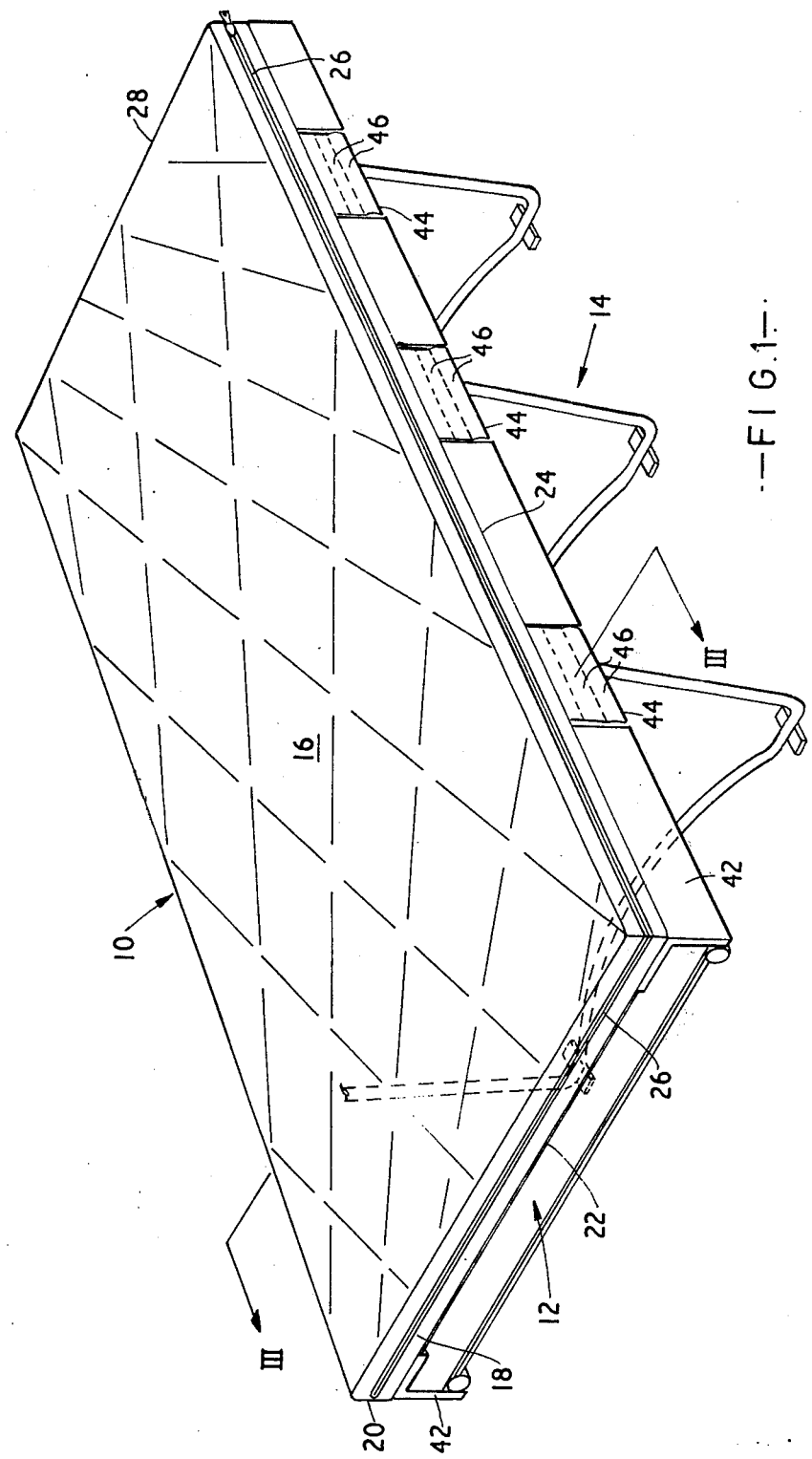

United States Patent [19]

Mitchell et al.

[11] 4,012,800
[45] Mar. 22, 1977

[54] BEDS

[76] Inventors: Harry Mitchell, 3 Laurel Ave., Euxton, near Chorley, Lancashire; William Augustine May, 640 Preston Road, Clayton-le-Woods, Chorley, Lancashire, both of England

[22] Filed: July 15, 1975

[21] Appl. No.: 596,128

[52] U.S. Cl. .................................. 5/187; 5/343
[51] Int. Cl.² ............... A47C 19/00; A47G 9/00
[58] Field of Search ............ 5/187, 191, 110, 114, 5/336, 343, 320

[56] References Cited

UNITED STATES PATENTS

| | | |
|---|---|---|
| 2,059,875 | 11/1936 | Katz ..................................... 5/322 |
| 2,242,311 | 5/1941 | Lucey ................................. 5/187 X |
| 2,628,367 | 2/1953 | Green ................................. 5/322 X |
| 2,637,048 | 5/1953 | Peters et al. ............................ 5/343 |
| 3,135,971 | 6/1964 | Haller ................................. 5/322 X |
| 3,918,109 | 11/1975 | Barraclough ........................... 5/113 |

Primary Examiner—Paul R. Gilliam
Assistant Examiner—Andrew M. Calvert
Attorney, Agent, or Firm—John C. Smith, Jr.

[57] ABSTRACT

A bed in the form of a sleeping bag constructed of a sleeping bag cover assembly mounted on a mattress and a frame on which the mattress and cover assembly is supported. The cover assembly partially encloses the mattress and is releasably secured to the frame to retain the mattress and the cover assembly thereon.

18 Claims, 5 Drawing Figures

BEDS

This invention relates to beds and more particularly to a bed in the form of a sleeping bag.

According to this invention, a bed comprises a cover assembly including two superimposed sheets of material joined or securable together at one end and along the sides thereof to form a bag which is open at one end, and fastening means adapted to at least partially enclose a mattress and retain the cover assembly thereon.

Preferably, the fastening means comprises two side sheets, each side sheet extending downwardly from one associated side of the cover assembly to at least partially enclose the side of the mattress. Each side sheet is, preferably, adapted to be releasably secured to a frame on which the mattress is supported and the frame may comprise two spaced-apart substantially parallel elongate members.

Preferably, also, each side sheet has one or more sleeves formed therein through which one of the elongate members is inserted to secure the cover assembly thereto and at least partially enclose the side of the mattress and each side sheet can comprise one or more flaps in which the or each sleeve is formed. Two or more spaced-apart substantially parallel sleeves are, preferably, formed in each flap to accommodate different thikcnesses of mattress.

Preferably, the two elongate members of the frame are connected together by one or more webs of material extending therebetween, the or each web being provided at or adjacent to the webs thereof with sleeve portions through which the elongate members are inserted. The two elongate members of the frame can be connected together by one or more leg assemblies for supporting the members above a surface on which the frame is to stand and for urging the two elongate members apart to tension the or each web extending therebetween.

A tubular member can be mounted on each end of the or each leg assembly and one of the flaps of the side sheet associated therewith releasably secured to the tubular member. Alternatively, the or each leg assembly may be provided at or adjacent to each end thereof with one or more holes to which one of the flaps of the side sheet associated therewith can be releasably secured by a clip member.

Preferably, the mattress comprises an upper and lower sheet of gas impervious material which sheets are connected together at or adjacent to their edges to form a gas tight enclosure and valve means for admitting gas under pressure to the enclosure to maintain at least part of the two sheets in spaced-apart relationship. Alternatively, the mattress can be formed of foamed rubber material.

The sheets of material forming the cover assembly can be padded quilts and the sheets of material may be releasably secured together at one end and along at least part of one side by a sliding clasp fastener.

Figure 2:
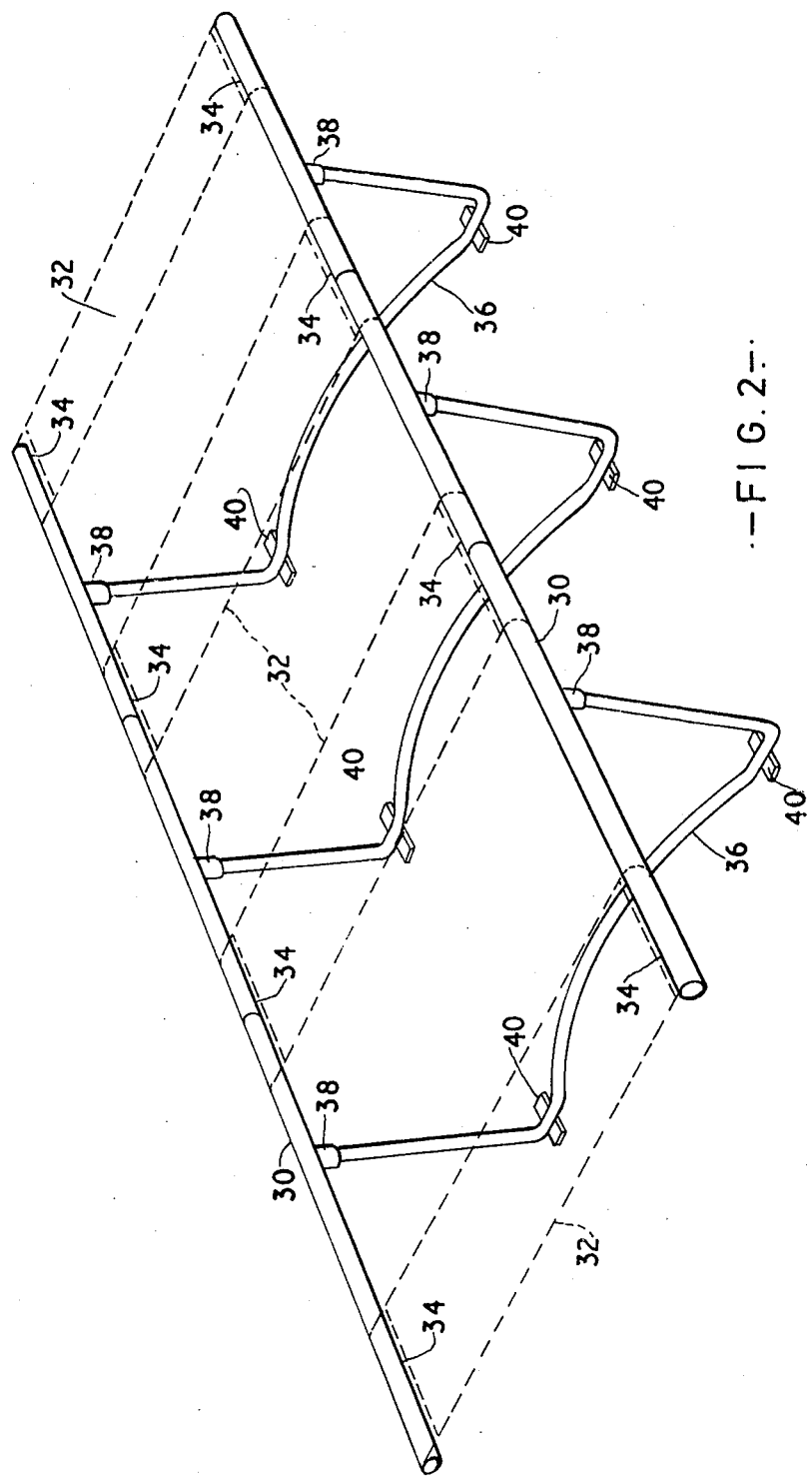
Figure 3:
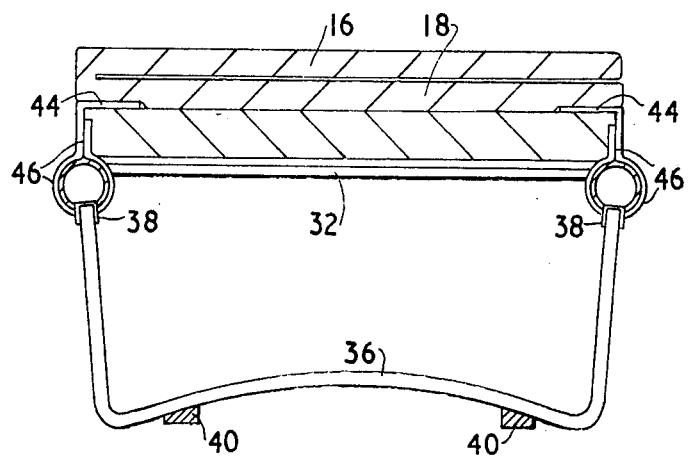
Figure 4:
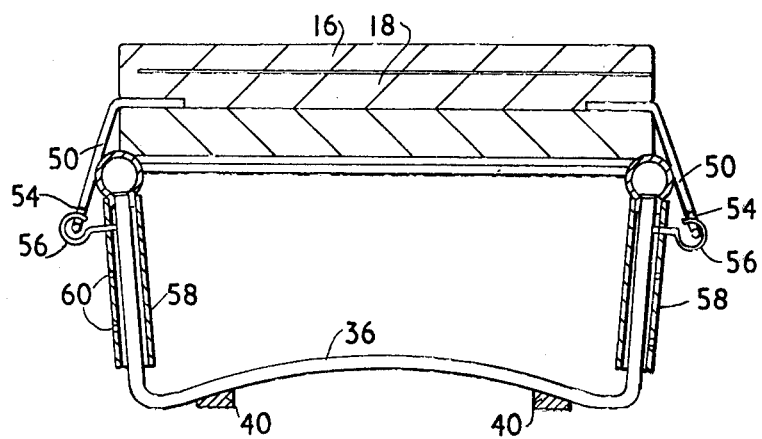
Figure 5:
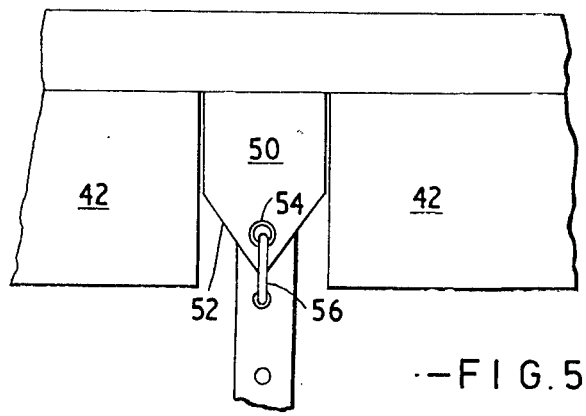

A preferred embodiment of this invention will now be described, by way of example only, with reference to the accompanying drawings of which:

FIG. 1 is a perspective view of a bed;
FIG. 2 is a perspective view of a frame of the bed;
FIG. 3 is a section on the line III—III in FIG. 1;
FIG. 4 is a section on the line III—III in FIG. 1 of the bed but illustrating an alternative fastening means; and
FIG. 5 is a side elevation of part of the bed with the alternative fastening means.

Referring now to the drawings, a bed in the form of a sleeping bag comprises a cover assembly indicated generally at 10 mounted on a mattress section indicated generally at 12 which is supported on a frame indicated generally at 14.

The cover assembly 10 is formed of an upper substantially rectangular sheet 16 of padded or quilted material and a lower substantially rectangular sheet 18 of padded or quilted material. The sheets 16 and 18 are joined together along one side edge 20 or are formed of a single sheet of padded or quilted material which is folded along the side edge 20. One end 22 and one side 24 of both sheets 16 and 18 are releasably secured together by a sliding clasp (zip) fastener 26 to form a conventional sleeping bag in which one end 28 is open.

The mattress section 12 on which the cover assembly is mounted comprises two sheets of gas impervious material connected together at or adjacent to their edges to form a gas tight enclosure and valve means (not shown) for admitting gas under pressure to maintain at least part of the two sheets in spaced-apart relationship. Alternatively, the mattress section 12 is formed of a substantially rectangular sheet of foamed rubber material.

The frame 14 on which the mattress section 12 is supported comprises two spaced-apart substantially parallel tubular members 30 each formed in three sections which are adapted to be secured together in end-to-end relationship in conventional manner by arranging that the end of one section is a push fit in the associated end of the section adjacent thereto. Four webs of material 32 shown in broken lines in FIG. 2 of the drawings are each provided at each end with a sleeve portion 34 through which the tubular members 30 are inserted so that the webs 32 are connected between the members 30. The sleeve portions 34 of the webs 32 at each end of the tubular members 30 are closed at their ends by stitching to form pockets into which the ends of the members 30 are inserted.

The tubular members 30 are also connected together by three spaced-apart leg assemblies 36 formed of steel rod. The ends of each assembly 36 are inserted into sockets 38 formed in each section of each member 30 and the leg assemblies 36 urge the tubular members 30 apart to tension the four webs 32 and form a support for the mattress section 12 across the entire width thereof. Each leg assembly 36 is provided with two spaced-apart feet 40 to enable the bed to be placed on soft ground and reduce the tendency of the leg assemblies 36 to sink into soft ground.

The cover assembly 10 is provided with two side sheets 42 which are connected at or adjacent to the side edges 20 and 24 of the lower sheet 18 and depend downwardly therefrom to enclose the sides of the mattress section 12. The portions of the side sheets 42 adjacent to the leg assemblies 36 are cut to form flaps 44 which are each provided with two or more vertical spaced apart sleeves 46. The associated tubular member 30 is inserted through the appropriate sleeve 46 formed in each flap 44 during the assembly of the frame 14 so that the cover assembly 10 is secured to the frame 14 with the mattress section 12 sandwiched therebetween. The provision of two or more sleeves 46 in each flap 44 allows the cover assembly 10 to be attached tightly to the frame 14 even when different thicknesses of mattress sections 12 are used. Each sleeve 46 is provided with an aperture (not shown) through which the end of the leg assembly 36 is inserted into the socket 38.

Referring now to FIGS. 4 and 5 of the drawings, in a modification, the side sheets 42 have flaps 50 formed therefrom having a substantially triangular-shaped free end 52 which is produced by folding the ends of the material of the flap 50 inwardly and stitching the folded ends in position to increase the strength of the flap 50. An eyelet 54 is mounted in the end 52 of the flap 50 and a C-shaped clip member 56 is attached thereto. Each leg assembly 36 is provided at its ends with a tube 58 in which are drilled a series of holes 60 into one of which the clip member 56 is secured to attach the flap 50 to the tube 58 and thus to the frame 14. The series of holes 60 provide adjustment to allow for different thicknesses of mattress. In this modification, a single web of material extending between the tubular members 30 of the frame 14 and along the entire length thereof can be used instead of the four separate webs.

In another modification, the flaps are formed of additional material and secured by stitching to the internal surface of the side sheets or the edges of the lower sheet 18 of the cover assembly 10 and the side sheets thus extend continuously along each side of the mattress section.

In a further modification, a series of holes are drilled in the ends of each leg assembly and the flaps are secured directly to the legs by the clip members without the necessity of providing any tubes on the ends of the legs.

In yet another modification, a head rest frame is mounted on the ends of the tubular members of the frame at the open end of the sleeping bag.

In yet a further modification, the clip is connected at one end to the leg assembly and the opposite end of the clip is secured to the associated flap by spring means such as an elastic band, helical tension spring or the like.

What we claim is:

1. A bed comprising a rectangular cover assembly including two superimposed sheets of material joined or securable together at one end and along the adjacent two sides thereof to form a bag which is open at the opposite end thereof, a resilient mattress on which said cover assembly is positioned, a frame on which said mattress is supported, and fastening means connected between said cover assembly and said frame, said fastening means at least partially enclosing said mattress and being maintained in tension at least partially by the resilience of said mattress to resist relative movement between said cover assembly and said mattress and between said mattress and said frame.

2. A bed according to claim 1, wherein the fastening means comprises two side sheets, each side sheet extending downwardly from one associated side of the cover assembly to at least partially enclose the side of the mattress.

3. A bed according to claim 2, wherein each side sheet is adapted to be releasably secured to a frame on which the mattress is supported.

4. A bed according to claim 3, wherein the frame on which the mattress is supported comprises two spaced-apart substantially parallel elongate members.

5. A bed according to claim 4, wherein each side sheet has at least one sleeve formed therein through which one of the elongate members is inserted to secure the cover assembly thereto and at least partially enclose the side of the mattress.

6. A bed according to claim 5, wherein each side sheet comprises at least one flap and said sleeve is formed in said flap.

7. A bed according to claim 6, wherein at least two spaced-apart substantially parallel sleeves are formed in each flap to accommodate different thicknesses of mattress.

8. A bed according to claim 4, wherein the two elongate members of the frame are connected together by at least one web of material extending therebetween, said web being provided at or adjacent to the ends thereof with sleeve portions through which the elongate members are inserted.

9. A bed according to claim 8, wherein the two elongate members of the frame are connected together by at least one leg assembly for supporting the members above a surface on which the frame is to stand and for urging the two elongate members apart to tension said web extending therebetween.

10. A bed according to claim 9, wherein a tubular member is mounted on each end of said leg assembly and one of the flaps of the side sheet associated therewith is releasably secured to the tubular member.

11. A bed according to claim 9, wherein said leg assembly is provided at or adjacent to each end thereof with at least one hole to which one of the flaps of the side sheet associated therewith is releasably secured by a clip member.

12. A bed according to claim 1, wherein the mattress comprises an upper and a lower sheet of gas impervious material which sheets are connected together at or adjacent to their edges to form a gas tight enclosure, and valve means for admitting gas under pressure to maintain at least part of the two sheets in spaced-apart relationship.

13. A bed according to claim 1, wherein the mattress is formed of a foamed rubber material.

14. A bed according to claim 1, wherein the two sheets of material forming the cover assembly each takes the form of a padded quilt.

15. A bed according to claim 1, wherein the two sheets of material forming the cover assembly are releasably secured together at one end along at least part of one side by a sliding clasp fastener.

16. A bed according to claim 1 wherein the fastening means comprises elongate lengths of material each secured at one end to the cover assembly and secured at the opposite end to the frame.

17. A bed according to claim 16 wherein the fastener means incorporates spring means.

18. A bed according to claim 4 wherein the frame is provided with a headrest assembly connected to the ends of the two spaced-apart substantially parallel elongate members at the ends thereof adjacent to the open end of the cover assembly.

* * * * *